United States Patent
Lee et al.

(10) Patent No.: US 8,497,946 B2
(45) Date of Patent: Jul. 30, 2013

(54) LIQUID CRYSTAL DISPLAY DEVICE

(75) Inventors: Woo-Keun Lee, Gimpo-si (KR);
Hyun-Jin Park, Paju-si (KR);
Jong-Hoon Woo, Goyang-si (KR);
Eun-Jung Lim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 490 days.

(21) Appl. No.: 12/958,813

(22) Filed: Dec. 2, 2010

(65) Prior Publication Data
US 2011/0141385 A1    Jun. 16, 2011

(30) Foreign Application Priority Data

Dec. 11, 2009    (KR) .................. 10-2009-0123492

(51) Int. Cl.
*G02F 1/133* (2006.01)

(52) U.S. Cl.
USPC ............................. 349/33; 349/117; 349/96

(58) Field of Classification Search
USPC ............................................ 349/33, 117–118
See application file for complete search history.

(56) References Cited

U.S. PATENT DOCUMENTS

| | | | | |
|---|---|---|---|---|
| 7,948,592 B2 * | 5/2011 | Do et al. | ........ | 349/118 |
| 2005/0206817 A1 * | 9/2005 | Kajita et al. | ........ | 349/119 |
| 2008/0211997 A1 * | 9/2008 | Chen et al. | ........ | 349/96 |
| 2010/0328593 A1 * | 12/2010 | Woo et al. | ........ | 349/119 |

* cited by examiner

*Primary Examiner* — Eric Wong
(74) *Attorney, Agent, or Firm* — Brinks Hofer Gilson & Lione

(57) ABSTRACT

A liquid crystal display device includes: first and second substrates facing and spaced apart from each other; a pixel electrode and a common electrode on an inner surface of the first substrate, the pixel electrode and the common electrode generating a horizontal electric field; a liquid crystal layer between the first and second substrates, wherein the liquid crystal layer includes a plurality of chiral nematic liquid crystal molecules having a helical axis parallel to a z direction normal to the first substrate and driven by the horizontal electric field, and wherein refractive indices of the liquid crystal layer along x and y directions ($n_x$, $n_y$) perpendicular to the z direction are the same as each other and a refractive index of the liquid crystal layer along the z direction ($n_z$) is smaller than the refractive indices of the liquid crystal layer along the x and y directions ($n_z < n_x = n_y$); first and second polarizing plates over outer surface of the first and second substrates, respectively; and at least one positive C plate over one of the outer surfaces of the first and second substrates, wherein refractive indices of the at least one positive C plate along the x and y directions ($n_x$, $n_y$) are the same as each other and a refractive index of the positive C plate along the z direction ($n_z$) is greater than the refractive indices of the positive C plate along the x and y directions ($n_z > n_x = n_y$).

14 Claims, 8 Drawing Sheets

LIQUID CRYSTAL DISPLAY DEVICE

The present application claims the benefit of Korean Patent Application No. 10-2009-0123492 filed in Korea on Dec. 11, 2009, which is hereby incorporated by reference in its entirety.

BACKGROUND

1. Field of the Disclosure

The present disclosure relates to a liquid crystal display (LCD) device, and more particularly, to a uniform standing helix (USH) mode liquid crystal display device including at least one positive C plate.

2. Discussion of the Related Art

As information technology progresses, flat panel display (FPD) devices having light weight, thin profile and low power consumption have been developed. Specifically, a cathode ray tube (CRT) device has been replaced by the FPD devices such as a liquid crystal display (LCD) device.

The LCD devices use the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field and the light is refracted along the alignment direction of the liquid crystal molecules due to the optical anisotropy, thereby images displayed.

Among various types LCD devices, an active matrix type liquid crystal display (AM-LCD) device in which a thin film transistor (TFT) and a pixel electrode are disposed in a matrix has been the subject of recent research due to its high resolution and superior quality for displaying moving images. The LCD device includes a color filter substrate having a common electrode, an array substrate having a pixel electrode, and a liquid crystal layer interposed between the color filter substrate and the array substrate. In the LCD device, the liquid crystal layer is driven by a vertical electric field between the pixel electrode and the common electrode. Although the LCD device provides a superior transmittance and a high aperture ratio, the LCD device has a narrow viewing angle because it is driven by the vertical electric field. Accordingly, various other types of LCD devices having wide viewing angles, such as in-plane switching (IPS) mode LCD device, have been developed.

Figure 1:
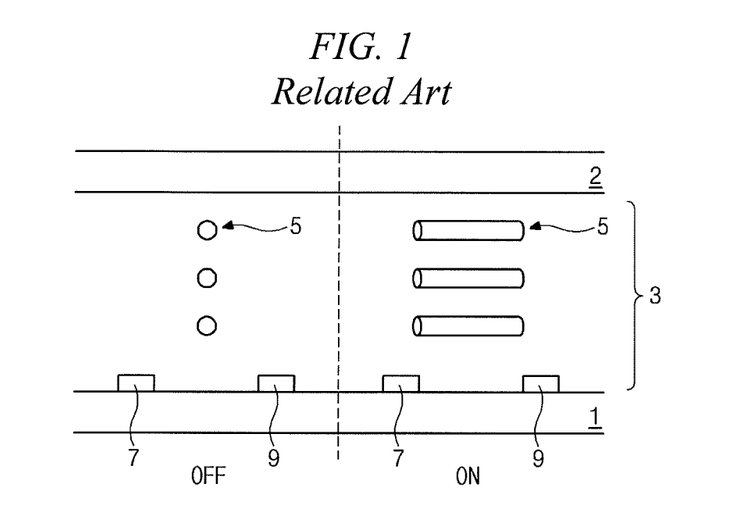
FIG. 1 is a cross-sectional view showing an in-plane switching mode liquid crystal display device according to the related art.

FIG. 1 is a cross-sectional view showing an in-plane switching mode liquid crystal display device according to the related art. In FIG. 1, an in-plane switching (IPS) mode liquid crystal display (LCD) device includes first and second substrates 1 and 2 facing and spaced apart from each other and a liquid crystal layer 3 between the first and second substrates 1 and 2. The liquid crystal layer 3 includes liquid crystal molecules 5. A pixel electrode 7 and a common electrode 9 are formed on the first substrate 1. When a voltage is applied to the pixel electrode 7 and the common electrode 9, a horizontal electric field is generated between the pixel electrode 7 and the common electrode 9 to control the liquid crystal molecules 5.

In an OFF state, an electric field is not generated between the pixel electrode 7 and the common electrode 9, and liquid crystal molecules 5 keep an initial alignment state such that the IPS mode LCD device displays a black image. In an ON state, a horizontal electric field is generated between the pixel electrode 7 and the common electrode 9, and the liquid crystal molecules 5 are re-aligned along the horizontal electric field such that the IPS mode LCD device displays a white image.

Although the IPS mode LCD device has advantages in a viewing angle and a response speed, the IPS mode LCD device has disadvantages in a contrast ratio. The IPS mode LCD device has a low contrast ratio due to a light leakage in the OFF state. To improve the low contrast ratio of the IPS mode LCD device, a vertical alignment (VA) mode LCD device has been suggested.

Figure 2:
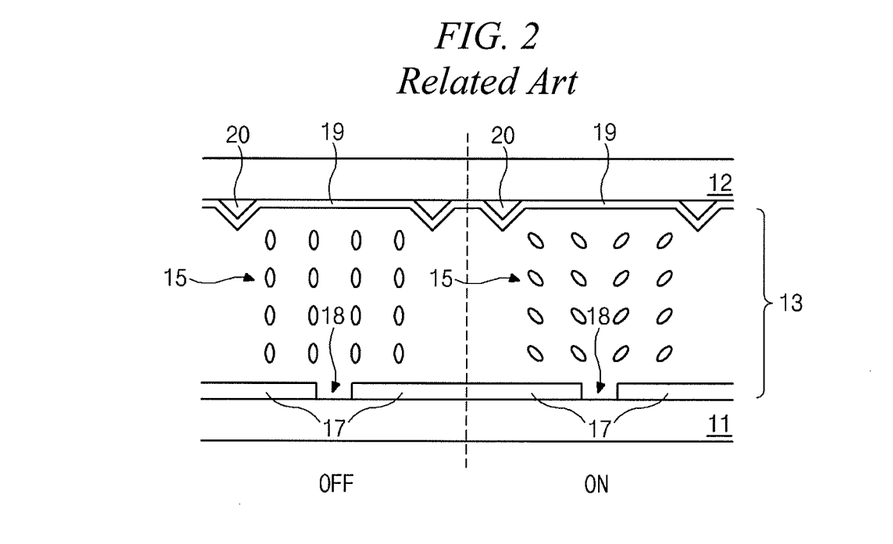
FIG. 2 is a cross-sectional view showing a vertical alignment mode liquid crystal display device according to the related art.

FIG. 2 is a cross-sectional view showing a vertical alignment mode liquid crystal display device according to the related art. In FIG. 2, a vertical alignment (VA) mode liquid crystal display (LCD) device includes first and second substrates 11 and 12 facing and spaced apart from each other and a liquid crystal layer 13 between the first and second substrates 11 and 12. The liquid crystal layer 13 includes liquid crystal molecules 15. A pixel electrode 17 having a slit 18 is formed on the first substrate 11. In addition, at least one protrusion 20 is formed on the second substrate 12, and a common electrode 19 is formed on the at least one protrusion 20 and the second substrate 12. When a voltage is applied to the pixel electrode 17 and the common electrode 19, a vertical electric field is generated between the pixel electrode 17 and the common electrode 19 to control the liquid crystal molecules 15.

Although the VA mode LCD device has advantages in a contrast ratio, the VA mode LCD device has disadvantages in the viewing angle. Accordingly, an LCD device having advantages both in a contrast ratio and a viewing angle is desired.

SUMMARY

A liquid crystal display device includes: first and second substrates facing and spaced apart from each other; a pixel electrode and a common electrode on an inner surface of the first substrate, the pixel electrode and the common electrode generating a horizontal electric field; a liquid crystal layer between the first and second substrates, wherein the liquid crystal layer includes a plurality of chiral nematic liquid crystal molecules having a helical axis parallel to a z direction normal to the first substrate and driven by the horizontal electric field, and wherein refractive indices of the liquid crystal layer along x and y directions ($n_x$, $n_y$) perpendicular to the z direction are the same as each other and a refractive index of the liquid crystal layer along the z direction ($n_z$) is smaller than the refractive indices of the liquid crystal layer along the x and y directions ($n_z < n_x = n_y$); first and second polarizing plates over outer surface of the first and second substrates, respectively; and at least one positive C plate over one of the outer surfaces of the first and second substrates, wherein refractive indices of the at least one positive C plate along the x and y directions ($n_x$, $n_y$) are the same as each other and a refractive index of the positive C plate along the z direction ($n_z$) is greater than the refractive indices of the positive C plate along the x and y directions ($n_z > n_x = n_y$).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the preferred embodiments, examples of which are illustrated in the accompanying drawings.

Figure 3:
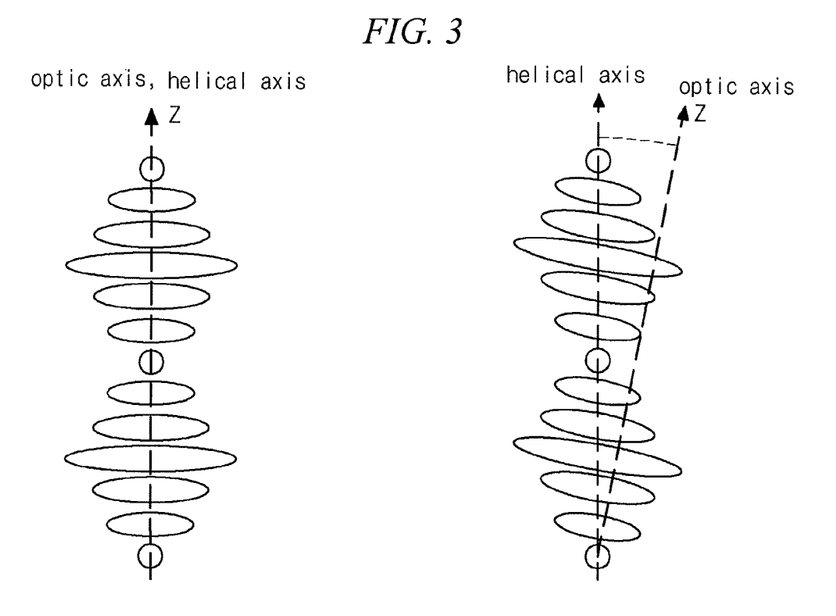
FIG. 3 is a view showing liquid crystal molecules of a uniform standing helix mode liquid crystal display device according to a first embodiment of the present invention.

FIG. 3 is a view showing liquid crystal molecules of a uniform standing helix mode liquid crystal display device according to a first embodiment of the present invention.

In FIG. 3, a uniform standing helix (USH) mode liquid crystal display (LCD) device includes chiral nematic liquid crystal molecules having a helical structure where the chiral nematic liquid crystal molecules are twisted by several tens times along a helical axis. The chiral nematic liquid crystal molecules having a short pitch are driven by using a flexoelectric effect. In an OFF state of no applied voltage, an optic axis z is parallel to the helix axis of the chiral nematic liquid crystal molecules. In an ON state of an applied voltage, the optic axis rotates to cross the helical axis and the chiral nematic liquid crystal molecules have a birefringence property.

Figure 4A:
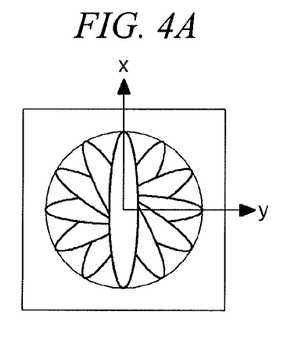
FIG. 4A is a front view showing liquid crystal molecules of a uniform standing helix mode liquid crystal display device according to a first embodiment of the present invention.
Figure 4B:
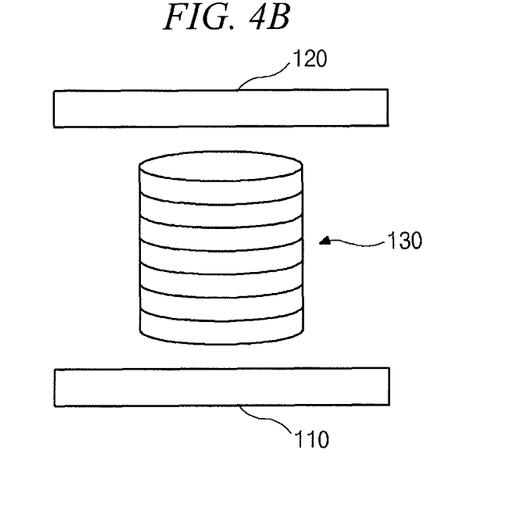
FIG. 4B is a view showing an equivalent structure of a uniform standing helix mode liquid crystal display device according to a first embodiment of the present invention.

FIG. 4A is a front view showing liquid crystal molecules of a uniform standing helix mode liquid crystal display device according to a first embodiment of the present invention, and FIG. 4B is a view showing an equivalent structure of a uniform standing helix mode liquid crystal display device according to a first embodiment of the present invention.

In FIGS. 4A and 4B, a uniform standing helix (USH) mode liquid crystal display (LCD) device includes first and second substrates 110 and 120 and a liquid crystal layer 130 between the first and second substrates 110 and 120. Although not shown in FIGS. 4A and 4B, first and second polarizing plates are formed on outer surfaces of the first and second substrates 110 and 120, respectively. Since a bimesogen liquid crystal is arranged to have a polarity in the liquid crystal layer 130, the USH mode LCD device has a relatively high response speed. In addition, chiral nematic liquid crystal molecules having a short pitch are twisted by several tens times along a helical axis in the liquid crystal layer 130 and the helical axis is parallel to an optic axis (z direction) which may be defined as a propagation direction of light. Accordingly, refractive indices of the liquid crystal layer 130 along x and y directions perpendicular to the z direction are the same as each other at a front viewing angle. ($n_x = n_y$) As a result, the USH mode LCD device has an optic isotropic property at the front viewing angle.

The first and second polarizing plates have polarization axes perpendicular to each other, and a light leakage at the front viewing angle is prevented due to the optic isotropic property. As a result, the USH mode LCD device has no birefringence at the front viewing angle in the OFF state of no applied voltage. However, the refractive indices of the liquid crystal layer 130 along the x and y directions are different from each other at a side viewing angle. ($n_x \neq n_y$) Accordingly, the USH mode LCD device has a light leakage at the side viewing angle, thereby having a narrow viewing angle.

FIGS. 5 to 15 are views showing uniform standing helix mode liquid crystal display devices according to second to twelfth embodiments, respectively, of the present invention.

In FIGS. 5 to 15, a uniform standing helix (USH) mode liquid crystal display (LCD) device includes positive C plate to overcome a limit at a side viewing angle due to a liquid crystal layer of negative C type. In addition, the USH mode LCD device may further include a positive A plate to compensate the positive C plate. A gate line (not shown), a data line (not shown), a thin film transistor (TFT), a pixel electrode and a common electrode are formed on an inner surface of a first substrate. The gate line and the data line cross each other to define a pixel region. The TFT is connected to the gate line and the data line, and the pixel electrode is connected to the TFT. A data voltage is applied to the pixel electrode through the TFT and a common voltage is applied to the common electrode. A black matrix and a color filter layer are formed on an inner surface of a second substrate. When the data voltage is applied to the pixel electrode, a horizontal electric field is generated between the pixel electrode and the common electrode and liquid crystal molecules in a liquid crystal layer are re-aligned along the horizontal electric field.

Figure 5:
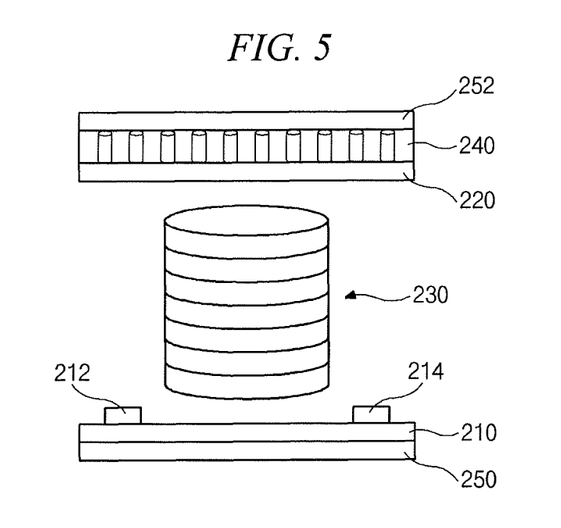
FIG. 5 is a view showing a uniform standing helix mode liquid crystal display device according to a second embodiment of the present invention.

In FIG. 5, a USH mode LCD device according to a second embodiment of the present invention includes first and second substrates 210 and 220 facing and spaced apart from each other, a liquid crystal layer 230 between the first and second substrates 210 and 220, a first polarizing plate 250 on an outer surface of the first substrate 210, a positive C plate 240 on an outer surface of the second substrate 220 and a second polarizing plate 252 on the positive C plate 240. A pixel electrode 212 and a common electrode 214 are formed on an inner surface of the first substrate 210, and a horizontal electric field is generated between the pixel electrode 212 and the common electrode 214 when a voltage is applied.

The liquid crystal layer 230 is driven by the horizontal electric field between the pixel electrode 212 and the common electrode 214. First and second polarization axes of the first and second polarizing plates 250 and 252 are perpendicular to each other. The liquid crystal layer 230 includes chiral nematic liquid crystal molecules having a helical axis parallel to an optic axis (z direction) normal to the inner surface of the first substrate 210. Accordingly, the chiral nematic liquid crystal molecules are driven by the horizontal electric field substantially perpendicular to the helical axis. In addition, the liquid crystal layer 230 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 230 are the same as each other, and the refractive index along z direction of the liquid crystal layer 230 is smaller than the refractive indices along x and y directions of the liquid crystal layer 230. ($n_z < n_x = n_y$) As a result, the liquid crystal layer 230 functions as a negative C plate.

The positive C plate 240 is formed between the second substrate 220 and the second polarizing plate 252 to compensate the liquid crystal layer 230 functioning as a negative C plate. The positive C plate 240 has refractive indices along x, y and z directions. The refractive indices along x and y directions of the positive C plate 240 are the same as each other, and the refractive index along z direction of the positive C plate 240 is greater than the refractive indices along x and y directions of the positive C plate 240. ($n_z > n_x = n_y$) For example, the positive C plate 240 may include a plurality of molecules of a bar shape arranged vertically.

The limit at a side viewing angle is overcome by combination of the positive C plate 240 and the liquid crystal layer 230 and the USH mode LCD device has an identical optic property at any viewing angle. Accordingly, the USH mode LCD device according to the second embodiment of the present invention has advantages in a response speed, a contrast ratio and a viewing angle.

Figure 6:
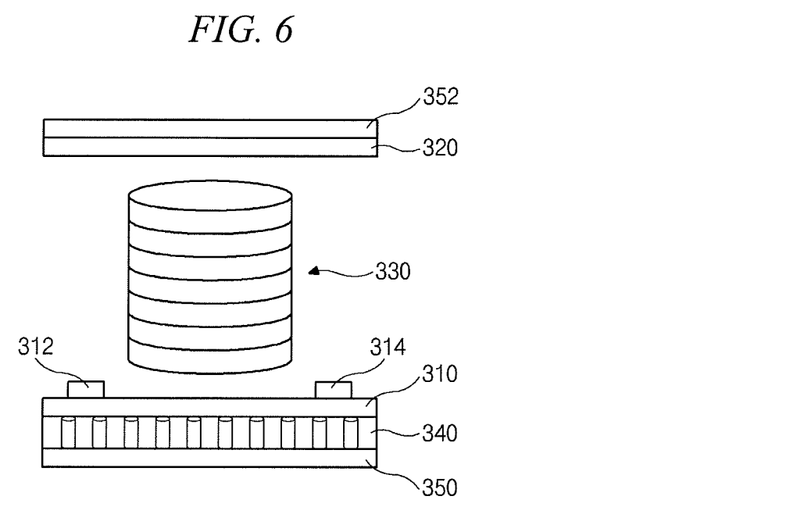
FIG. 6 is a view showing a uniform standing helix mode liquid crystal display device according to a third embodiment of the present invention.

In FIG. 6, a USH mode LCD device according to a third embodiment of the present invention includes first and second substrates 310 and 320 facing and spaced apart from each other, a liquid crystal layer 330 between the first and second substrates 310 and 320, a positive C plate 340 on an outer surface of the first substrate 310, a first polarizing plate 350 on the positive C plate 340 and a second polarizing plate 352 on an outer surface of the second substrate 320. A pixel electrode 312 and a common electrode 314 are formed on an inner surface of the first substrate 310, and a horizontal electric field is generated between the pixel electrode 312 and the common electrode 314 when a voltage is applied.

The liquid crystal layer 330 is driven by the horizontal electric field between the pixel electrode 312 and the common electrode 314. First and second polarization axes of the first and second polarizing plates 350 and 352 are perpendicular to each other. The liquid crystal layer 330 includes chiral nematic liquid crystal molecules having a helical axis parallel to an optic axis (z direction) normal to the inner surface of the first substrate 310. Accordingly, the chiral nematic liquid crystal molecules are driven by the horizontal electric field substantially perpendicular to the helical axis. In addition, the liquid crystal layer 330 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 330 are the same as each other, and the refractive index along z direction of the liquid crystal layer 330 is smaller than the refractive indices along x and y directions of the liquid crystal layer 330. ($n_z < n_x = n_y$) As a result, the liquid crystal layer 330 functions as a negative C plate.

The positive C plate 340 is formed between the first substrate 310 and the first polarizing plate 350 to compensate the liquid crystal layer 330 functioning as a negative C plate. The positive C plate 340 has refractive indices along x, y and z directions. The refractive indices along x and y directions of the positive C plate 340 are the same as each other, and the refractive index along z direction of the positive C plate 340 is greater than the refractive indices along x and y directions of the positive C plate 340. ($n_z > n_x = n_y$) For example, the positive C plate 340 may include a plurality of molecules of a bar shape arranged vertically.

The limit at a side viewing angle is overcome by combination of the positive C plate 340 and the liquid crystal layer 330 and the USH mode LCD device has an identical optic property at any viewing angle. Accordingly, the USH mode LCD device according to the third embodiment of the present invention has advantages in a response speed, a contrast ratio and a viewing angle.

Figure 7:
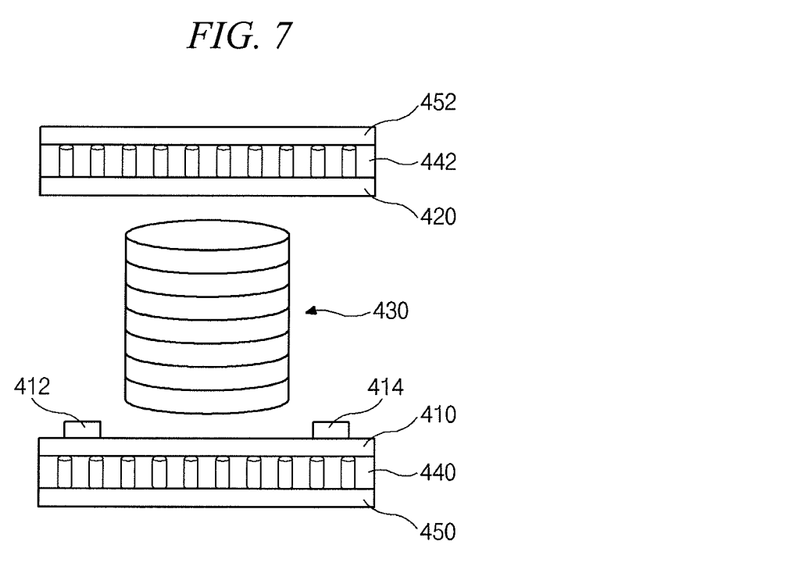
FIG. 7 is a view showing a uniform standing helix mode liquid crystal display device according to a fourth embodiment of the present invention.

In FIG. 7, a USH mode LCD device according to a fourth embodiment of the present invention includes first and second substrates 410 and 420 facing and spaced apart from each other, a liquid crystal layer 430 between the first and second substrates 410 and 420, a first positive C plate 440 on an outer surface of the first substrate 410, a first polarizing plate 450 on the first positive C plate 440, a second positive C plate 442 on an outer surface of the second substrate 420 and a second polarizing plate 452 on the second positive C plate 442. A pixel electrode 412 and a common electrode 414 are formed on an inner surface of the first substrate 410, and a horizontal electric field is generated between the pixel electrode 412 and the common electrode 414 when a voltage is applied.

The liquid crystal layer 430 is driven by the horizontal electric field between the pixel electrode 412 and the common electrode 414. First and second polarization axes of the first and second polarizing plates 450 and 452 are perpendicular to each other. The liquid crystal layer 430 includes chiral nematic liquid crystal molecules having a helical axis parallel to an optic axis (z direction) normal to the inner surface of the first substrate 410. Accordingly, the chiral nematic liquid crystal molecules are driven by the horizontal electric field substantially perpendicular to the helical axis. In addition, the liquid crystal layer 430 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 430 are the same as each other, and the refractive index along z direction of the liquid crystal layer 430 is smaller than the refractive indices along x and y directions of the liquid crystal layer 330. ($n_z < n_x = n_y$) As a result, the liquid crystal layer 430 functions as a negative C plate.

The first positive C plate 440 is formed between the first substrate 410 and the first polarizing plate 450 and the second positive C plate 442 is formed between the second substrate 420 and the second polarizing plate 452 to compensate the liquid crystal layer 430 functioning as a negative C plate. Each of the first and second positive C plates 440 and 442 has refractive indices along x, y and z directions. The refractive indices along x and y directions of each of the first and second positive C plates 440 and 442 are the same as each other, and the refractive index along z direction of each of the first and second positive C plates 440 and 442 is greater than the refractive indices along x and y directions of each of the first and second positive C plates 440 and 442. ($n_z > n_x = n_y$) For example, each of the first and second positive C plates 440 and 442 may include a plurality of molecules of a bar shape arranged vertically.

The limit at a side viewing angle is overcome by combination of the first and second positive C plates 440 and 442 and the liquid crystal layer 430, and the USH mode LCD device has an identical optic property at any viewing angle. Accordingly, the USH mode LCD device according to the fourth embodiment of the present invention has advantages in a response speed, a contrast ratio and a viewing angle.

Figure 8:
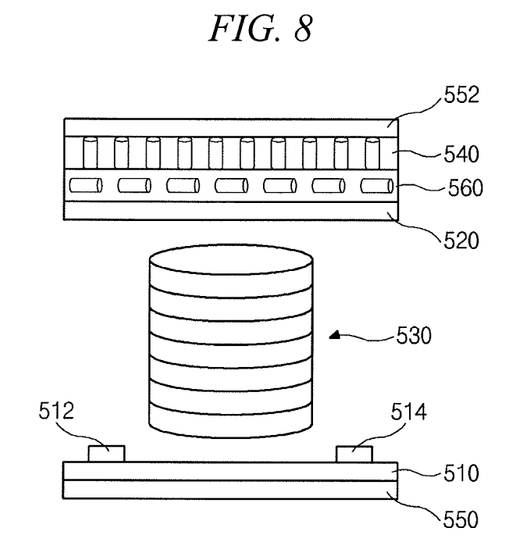
FIG. 8 is a view showing a uniform standing helix mode liquid crystal display device according to a fifth embodiment of the present invention.

In FIG. 8, a USH mode LCD device according to a fifth embodiment of the present invention includes first and second substrates 510 and 520 facing and spaced apart from each other, a liquid crystal layer 530 between the first and second substrates 510 and 520, a first polarizing plate 550 on an outer surface of the first substrate 510, a positive A plate 560 on an outer surface of the second substrate 520, a positive C plate 540 on the positive A plate 560 and a second polarizing plate 552 on the positive C plate 540. A pixel electrode 512 and a common electrode 514 are formed on an inner surface of the first substrate 510, and a horizontal electric field is generated between the pixel electrode 512 and the common electrode 514 when a voltage is applied.

The liquid crystal layer 530 is driven by the horizontal electric field between the pixel electrode 512 and the common electrode 514. First and second polarization axes of the first and second polarizing plates 550 and 552 are perpendicular to each other. The liquid crystal layer 530 includes chiral nematic liquid crystal molecules having a helical axis parallel to an optic axis (z direction) normal to the inner surface of the first substrate 510. Accordingly, the chiral nematic liquid crystal molecules are driven by the horizontal electric field substantially perpendicular to the helical axis. In addition, the liquid crystal layer 530 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 530 are the same as each other, and the refractive index along z direction of the liquid crystal layer 530 is smaller than the refractive indices along x and y directions of the liquid crystal layer 530. ($n_z < n_x = n_y$) As a result, the liquid crystal layer 530 functions as a negative C plate.

The positive C plate 540 is formed between the second substrate 520 and the second polarizing plate 552 to compensate the liquid crystal layer 530 functioning as a negative C plate. The positive C plate 540 may be formed on the second polarizing plate 552 through a coating method and may include a plurality of molecules of a bar shape arranged vertically. However, the positive C plate 540 does not have a perfect vertical arrangement of the plurality of molecules. As a result, the positive C plate 540 having a slanting arrangement does not completely compensate the liquid crystal layer 530. For example, although a light leakage at a side viewing angle is reduced, the USH mode LCD device may have a light leakage at a front viewing angle.

To solve the above problems, the positive A plate 560 is formed between the second substrate 520 and the positive C plate 540. The positive A plate 560 has refractive indices along x, y and z directions. The refractive indices along y and z directions of the positive A plate 560 are the same as each other, and the refractive index along x direction of the positive A plate 560 is greater than the refractive indices along y and z directions of the positive A plate 560. ($n_x > n_y = n_z$) For example, the positive A plate 560 may include a plurality of molecules of a bar shape arranged horizontally.

The limit at a side viewing angle is overcome by combination of the positive C plate 540 and the liquid crystal layer 530, and the positive C plate 540 is compensated by the positive A plate 560. As a result, the USH mode LCD device has an identical optic property at any viewing angle. Accordingly, the USH mode LCD device according to the fifth embodiment of the present invention has advantages in a response speed, a contrast ratio and a viewing angle.

Figure 9:
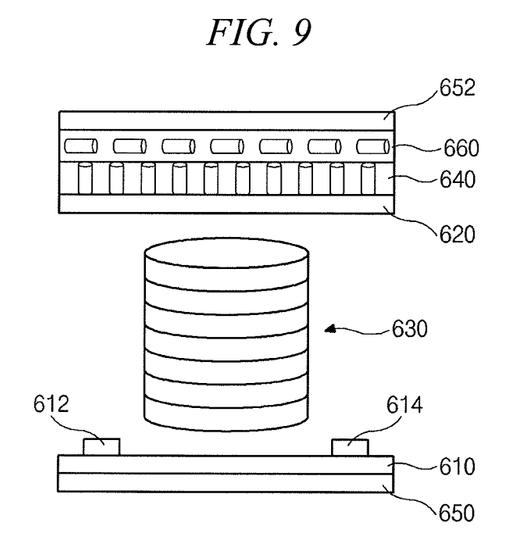
FIG. 9 is a view showing a uniform standing helix mode liquid crystal display device according to a sixth embodiment of the present invention.

In FIG. 9, a USH mode LCD device according to a sixth embodiment of the present invention includes first and second substrates 610 and 620 facing and spaced apart from each other, a liquid crystal layer 630 between the first and second substrates 610 and 620, a first polarizing plate 650 on an outer surface of the first substrate 610, a positive C plate 640 on an outer surface of the second substrate 620, a positive A plate 660 on the positive C plate 640 and a second polarizing plate 652 on the positive A plate 660. A pixel electrode 612 and a common electrode 614 are formed on an inner surface of the first substrate 610, and a horizontal electric field is generated between the pixel electrode 612 and the common electrode 614 when a voltage is applied.

The liquid crystal layer 630 is driven by the horizontal electric field between the pixel electrode 612 and the common electrode 614. First and second polarization axes of the first and second polarizing plates 650 and 652 are perpendicular to each other. The liquid crystal layer 630 includes chiral nematic liquid crystal molecules having a helical axis parallel to an optic axis (z direction) normal to the inner surface of the first substrate 610. Accordingly, the chiral nematic liquid crystal molecules are driven by the horizontal electric field substantially perpendicular to the helical axis. In addition, the liquid crystal layer 630 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 630 are the same as each other, and the refractive index along z direction of the liquid crystal layer 630 is smaller than the refractive indices along x and y directions of the liquid crystal layer 630. ($n_z < n_x = n_y$) As a result, the liquid crystal layer 630 functions as a negative C plate.

The positive C plate 640 is formed between the second substrate 620 and the second polarizing plate 652 to compensate the liquid crystal layer 630 functioning as a negative C plate. The positive C plate 640 may include a plurality of molecules of a bar shape arranged vertically. However, the positive C plate 640 does not have a perfect vertical arrangement of the plurality of molecules. As a result, the positive C plate 640 having a slanting arrangement does not completely compensate the liquid crystal layer 630. For example, although a light leakage at a side viewing angle is reduced, the USH mode LCD device may have a light leakage at a front viewing angle.

To solve the above problems, the positive A plate 660 is formed between the positive C plate 640 and the second polarizing plate 652. The positive A plate 660 has refractive indices along x, y and z directions. The refractive indices along y and z directions of the positive A plate 660 are the same as each other, and the refractive index along x direction of the positive A plate 660 is greater than the refractive indices along y and z directions of the positive A plate 660. ($n_x > n_y = n_z$) For example, the positive A plate 660 may include a plurality of molecules of a bar shape arranged horizontally.

The limit at a side viewing angle is overcome by combination of the positive C plate 640 and the liquid crystal layer 630, and the positive C plate 640 is compensated by the positive A plate 660. As a result, the USH mode LCD device has an identical optic property at any viewing angle. Accordingly, the USH mode LCD device according to the sixth embodiment of the present invention has advantages in a response speed, a contrast ratio and a viewing angle.

Figure 10:
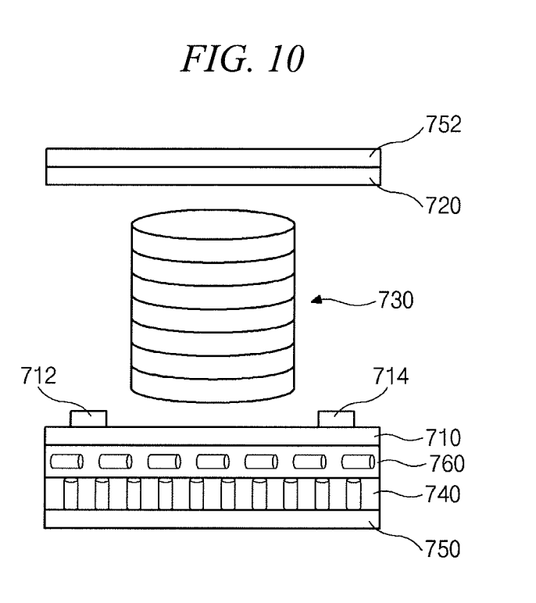
FIG. 10 is a view showing a uniform standing helix mode liquid crystal display device according to a seventh embodiment of the present invention.

In FIG. 10, a USH mode LCD device according to a seventh embodiment of the present invention includes first and second substrates 710 and 720 facing and spaced apart from each other, a liquid crystal layer 730 between the first and second substrates 710 and 720, a positive A plate 760 on an outer surface of the first substrate 710, a positive C plate 740 on the positive A plate 760, a first polarizing plate 750 on the positive C plate 740 and a second polarizing plate 752 on an outer surface of the second substrate 752. A pixel electrode 712 and a common electrode 714 are formed on an inner surface of the first substrate 710, and a horizontal electric field is generated between the pixel electrode 712 and the common electrode 714 when a voltage is applied.

The liquid crystal layer 730 is driven by the horizontal electric field between the pixel electrode 712 and the common electrode 714. First and second polarization axes of the first and second polarizing plates 750 and 752 are perpendicular to each other. The liquid crystal layer 730 includes chiral nematic liquid crystal molecules having a helical axis parallel to an optic axis (z direction) normal to the inner surface of the first substrate 710. Accordingly, the chiral nematic liquid crystal molecules are driven by the horizontal electric field substantially perpendicular to the helical axis. In addition, the liquid crystal layer 730 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 730 are the same as each other, and the refractive index along z direction of the liquid crystal layer 730 is smaller than the refractive indices along x and y directions of the liquid crystal layer 730. ($n_z < n_x = n_y$) As a result, the liquid crystal layer 730 functions as a negative C plate.

The positive C plate 740 is formed between the first substrate 710 and the first polarizing plate 750 to compensate the liquid crystal layer 730 functioning as a negative C plate. The positive C plate 740 may include a plurality of molecules of a bar shape arranged vertically. However, the positive C plate 740 does not have a perfect vertical arrangement of the plurality of molecules. As a result, the positive C plate 740 having a slanting arrangement does not completely compensate the liquid crystal layer 730. For example, although a light leakage at a side viewing angle is reduced, the USH mode LCD device may have a light leakage at a front viewing angle.

To solve the above problems, the positive A plate 760 is formed between the first substrate 710 and the positive C plate 740. The positive A plate 760 has refractive indices along x, y and z directions. The refractive indices along y and z directions of the positive A plate 760 are the same as each other, and the refractive index along x direction of the positive A plate 760 is greater than the refractive indices along y and z directions of the positive A plate 760. ($n_x > n_y = n_z$) For example, the positive A plate 760 may include a plurality of molecules of a bar shape arranged horizontally.

The limit at a side viewing angle is overcome by combination of the positive C plate 740 and the liquid crystal layer 730, and the positive C plate 740 is compensated by the positive A plate 760. As a result, the USH mode LCD device has an identical optic property at any viewing angle. Accordingly, the USH mode LCD device according to the seventh embodiment of the present invention has advantages in a response speed, a contrast ratio and a viewing angle.

Figure 11:
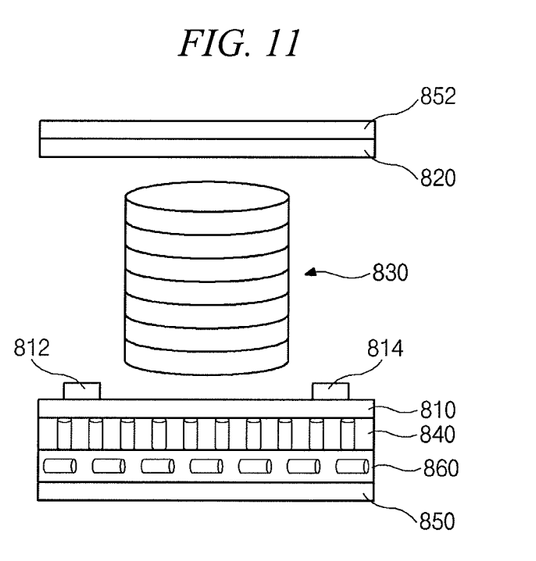
FIG. 11 is a view showing a uniform standing helix mode liquid crystal display device according to a eighth embodiment of the present invention.

In FIG. 11, a USH mode LCD device according to a eighth embodiment of the present invention includes first and second substrates 810 and 820 facing and spaced apart from each other, a liquid crystal layer 830 between the first and second substrates 810 and 820, a positive C plate 840 on an outer surface of the first substrate 810, a positive A plate 860 on the positive C plate 840, a first polarizing plate 850 on the positive A plate 860 and a second polarizing plate 852 on an outer surface of the second substrate 852. A pixel electrode 812 and a common electrode 814 are formed on an inner surface of the first substrate 810, and a horizontal electric field is generated between the pixel electrode 812 and the common electrode 814 when a voltage is applied.

The liquid crystal layer 830 is driven by the horizontal electric field between the pixel electrode 812 and the common electrode 814. First and second polarization axes of the first and second polarizing plates 850 and 852 are perpendicular to each other. The liquid crystal layer 830 includes chiral nematic liquid crystal molecules having a helical axis parallel to an optic axis (z direction) normal to the inner surface of the first substrate 810. Accordingly, the chiral nematic liquid crystal molecules are driven by the horizontal electric field substantially perpendicular to the helical axis. In addition, the liquid crystal layer 830 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 830 are the same as each other, and the refractive index along z direction of the liquid crystal layer 830 is smaller than the refractive indices along x and y directions of the liquid crystal layer 830. ($n_z < n_x = n_y$) As a result, the liquid crystal layer 830 functions as a negative C plate.

The positive C plate 840 is formed between the first substrate 810 and the first polarizing plate 850 to compensate the liquid crystal layer 830 functioning as a negative C plate. The positive C plate 840 may include a plurality of molecules of a bar shape arranged vertically. However, the positive C plate 840 does not have a perfect vertical arrangement of the plurality of molecules. As a result, the positive C plate 840 having a slanting arrangement does not completely compensate the liquid crystal layer 830. For example, although a light leakage at a side viewing angle is reduced, the USH mode LCD device may have a light leakage at a front viewing angle.

To solve the above problems, the positive A plate 860 is formed between the positive C plate 840 and the first polarizing plate 850. The positive A plate 860 has refractive indices along x, y and z directions. The refractive indices along y and z directions of the positive A plate 860 are the same as each other, and the refractive index along x direction of the positive A plate 860 is greater than the refractive indices along y and z directions of the positive A plate 860. ($n_x > n_y = n_z$) For example, the positive A plate 860 may include a plurality of molecules of a bar shape arranged horizontally.

The limit at a side viewing angle is overcome by combination of the positive C plate 840 and the liquid crystal layer 830, and the positive C plate 840 is compensated by the positive A plate 860. As a result, the USH mode LCD device has an identical optic property at any viewing angle. Accordingly, the USH mode LCD device according to the eighth embodiment of the present invention has advantages in a response speed, a contrast ratio and a viewing angle.

Figure 12:
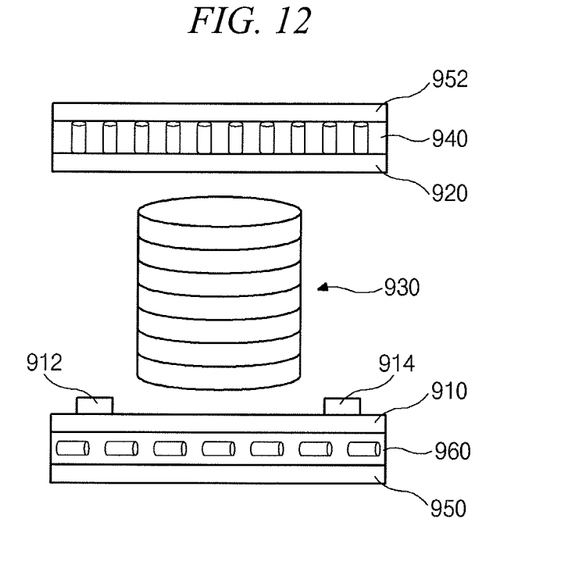
FIG. 12 is a view showing a uniform standing helix mode liquid crystal display device according to a ninth embodiment of the present invention.

In FIG. 12, a USH mode LCD device according to a ninth embodiment of the present invention includes first and second substrates 910 and 920 facing and spaced apart from each other, a liquid crystal layer 930 between the first and second substrates 910 and 920, a positive A plate 960 on an outer surface of the first substrate 910, a first polarizing plate 950 on the positive A plate 960, a positive C plate 940 on an outer surface of the second substrate 920 and a second polarizing plate 952 on the positive C plate 940. A pixel electrode 912 and a common electrode 914 are formed on an inner surface of the first substrate 910, and a horizontal electric field is generated between the pixel electrode 912 and the common electrode 914 when a voltage is applied.

The liquid crystal layer 930 is driven by the horizontal electric field between the pixel electrode 912 and the common electrode 914. First and second polarization axes of the first and second polarizing plates 950 and 952 are perpendicular to each other. The liquid crystal layer 930 includes chiral nematic liquid crystal molecules having a helical axis parallel to an optic axis (z direction) normal to the inner surface of the first substrate 910. Accordingly, the chiral nematic liquid crystal molecules are driven by the horizontal electric field substantially perpendicular to the helical axis. In addition, the liquid crystal layer 930 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 930 are the same as each other, and the refractive index along z direction of the liquid crystal layer 930 is smaller than the refractive indices along x and y directions of the liquid crystal layer 930. ($n_z < n_x = n_y$) As a result, the liquid crystal layer 930 functions as a negative C plate.

The positive C plate 940 is formed between the second substrate 920 and the second polarizing plate 952 to compensate the liquid crystal layer 930 functioning as a negative C plate. The positive C plate 940 may include a plurality of molecules of a bar shape arranged vertically. However, the positive C plate 940 does not have a perfect vertical arrangement of the plurality of molecules. As a result, the positive C plate 940 having a slanting arrangement does not completely compensate the liquid crystal layer 930. For example, although a light leakage at a side viewing angle is reduced, the USH mode LCD device may have a light leakage at a front viewing angle.

To solve the above problems, the positive A plate 960 is formed between the first substrate 910 and the first polarizing plate 950. The positive A plate 960 has refractive indices along x, y and z directions. The refractive indices along y and z directions of the positive A plate 960 are the same as each other, and the refractive index along x direction of the positive A plate 960 is greater than the refractive indices along y and z directions of the positive A plate 960. ($n_x > n_y = n_z$) For example, the positive A plate 960 may include a plurality of molecules of a bar shape arranged horizontally.

The limit at a side viewing angle is overcome by combination of the positive C plate 940 and the liquid crystal layer 930, and the positive C plate 940 is compensated by the positive A plate 960. As a result, the USH mode LCD device has an identical optic property at any viewing angle. Accordingly, the USH mode LCD device according to the ninth embodiment of the present invention has advantages in a response speed, a contrast ratio and a viewing angle.

Figure 13:
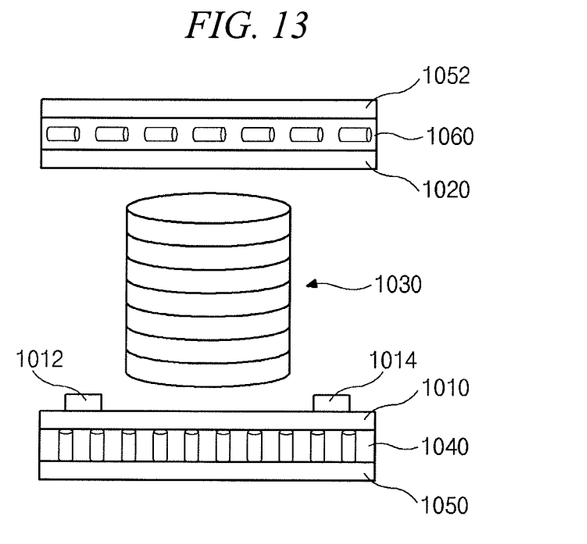
FIG. 13 is a view showing a uniform standing helix mode liquid crystal display device according to a tenth embodiment of the present invention.

In FIG. 13, a USH mode LCD device according to a tenth embodiment of the present invention includes first and second substrates 1010 and 1020 facing and spaced apart from each other, a liquid crystal layer 1030 between the first and second substrates 1010 and 1020, a positive C plate 1040 on an outer surface of the first substrate 1010, a first polarizing plate 1050 on the positive C plate 1040, a positive A plate 1060 on an outer surface of the second substrate 1020 and a second polarizing plate 1052 on the positive A plate 1060. A pixel electrode 1012 and a common electrode 1014 are formed on an inner surface of the first substrate 1010, and a horizontal electric field is generated between the pixel electrode 1012 and the common electrode 1014 when a voltage is applied.

The liquid crystal layer 1030 is driven by the horizontal electric field between the pixel electrode 1012 and the common electrode 1014. First and second polarization axes of the first and second polarizing plates 1050 and 1052 are perpendicular to each other. The liquid crystal layer 1030 includes chiral nematic liquid crystal molecules having a helical axis parallel to an optic axis (z direction) normal to the inner surface of the first substrate 1010. Accordingly, the chiral nematic liquid crystal molecules are driven by the horizontal electric field substantially perpendicular to the helical axis. In addition, the liquid crystal layer 1030 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 1030 are the same as each other, and the refractive index along z direction of the liquid crystal layer 1030 is smaller than the refractive indices along x and y directions of the liquid crystal layer 1030. ($n_z < n_x = n_y$) As a result, the liquid crystal layer 1030 functions as a negative C plate.

The positive C plate 1040 is formed between the first substrate 1010 and the first polarizing plate 1050 to compensate the liquid crystal layer 1030 functioning as a negative C plate. The positive C plate 1040 may include a plurality of molecules of a bar shape arranged vertically. However, the positive C plate 1040 does not have a perfect vertical arrangement of the plurality of molecules. As a result, the positive C plate 1040 having a slanting arrangement does not completely compensate the liquid crystal layer 1030. For example, although a light leakage at a side viewing angle is reduced, the USH mode LCD device may have a light leakage at a front viewing angle.

To solve the above problems, the positive A plate 1060 is formed between the second substrate 1020 and the second polarizing plate 1052. The positive A plate 1060 has refractive indices along x, y and z directions. The refractive indices along y and z directions of the positive A plate 1060 are the same as each other, and the refractive index along x direction of the positive A plate 1060 is greater than the refractive indices along y and z directions of the positive A plate 1060. ($n_x > n_y = n_z$) For example, the positive A plate 1060 may include a plurality of molecules of a bar shape arranged horizontally.

The limit at a side viewing angle is overcome by combination of the positive C plate 1040 and the liquid crystal layer 1030, and the positive C plate 1040 is compensated by the positive A plate 1060. As a result, the USH mode LCD device has an identical optic property at any viewing angle. Accordingly, the USH mode LCD device according to the tenth embodiment of the present invention has advantages in a response speed, a contrast ratio and a viewing angle.

Figure 14:
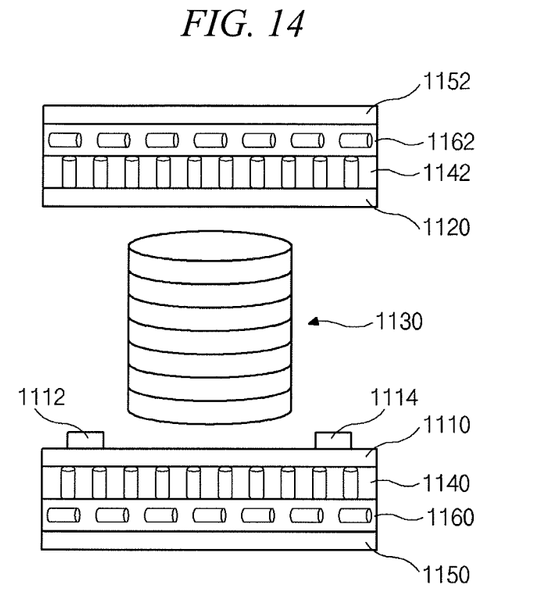
FIG. 14 is a view showing a uniform standing helix mode liquid crystal display device according to a eleventh embodiment of the present invention.

In FIG. 14, a USH mode LCD device according to a eleventh embodiment of the present invention includes first and second substrates 1110 and 1120 facing and spaced apart from each other, a liquid crystal layer 1130 between the first and second substrates 1110 and 1120, a first positive C plate 1140 on an outer surface of the first substrate 1110, a first positive A plate 1160 on the first positive C plate 1140, a first polarizing plate 1150 on the first positive A plate 1160, a second positive C plate 1142 on an outer surface of the second substrate 1120, a second positive A plate 1162 on the second positive C plate 1142 and a second polarizing plate 1152 on the second positive A plate 1162. A pixel electrode 1112 and a common electrode 1114 are formed on an inner surface of the first substrate 1110, and a horizontal electric field is generated between the pixel electrode 1112 and the common electrode 1114 when a voltage is applied.

The liquid crystal layer 1130 is driven by the horizontal electric field between the pixel electrode 1112 and the common electrode 1114. First and second polarization axes of the first and second polarizing plates 1150 and 1152 are perpendicular to each other. The liquid crystal layer 1130 includes chiral nematic liquid crystal molecules having a helical axis parallel to an optic axis (z direction) normal to the inner surface of the first substrate 1110. Accordingly, the chiral nematic liquid crystal molecules are driven by the horizontal electric field substantially perpendicular to the helical axis. In addition, the liquid crystal layer 1130 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 1130 are the same as each other, and the refractive index along z direction of the liquid crystal layer 1130 is smaller than the refractive indices along x and y directions of the liquid crystal layer 1130. ($n_z<n_x=n_y$) As a result, the liquid crystal layer 1130 functions as a negative C plate.

The first positive C plate 1140 is formed between the first substrate 1110 and the first polarizing plate 1150 and the second positive C plate 1142 is formed between the second substrate 1120 and the second polarizing plate 1152 to compensate the liquid crystal layer 1130 functioning as a negative C plate. Each of the first and second positive C plates 1140 and 1142 may include a plurality of molecules of a bar shape arranged vertically. However, each of the first and second positive C plates 1140 and 1142 does not have a perfect vertical arrangement of the plurality of molecules. As a result, each of the first and second positive C plates 1140 and 1142 having a slanting arrangement does not completely compensate the liquid crystal layer 1130. For example, although a light leakage at a side viewing angle is reduced, the USH mode LCD device may have a light leakage at a front viewing angle.

To solve the above problems, the first positive A plate 1160 is formed between the first positive C plate 1140 and the first polarizing plate 1150 and the second positive A plate 1162 is formed between the second positive C plate 1142 and the second polarizing plate 1152. Each of the first and second positive A plates 1160 and 1162 has refractive indices along x, y and z directions. The refractive indices along y and z directions of each of the first and second positive A plates 1160 and 1162 are the same as each other, and the refractive index along x direction of each of the first and second positive A plates 1160 and 1162 is greater than the refractive indices along y and z directions of each of the first and second positive A plates 1160 and 1162. ($n_x>n_y=n_z$) For example, each of the first and second positive A plates 1160 and 1162 may include a plurality of molecules of a bar shape arranged horizontally.

The limit at a side viewing angle is overcome by combination of the first and second positive C plates 1140 and 1142 and the liquid crystal layer 1130, and the first and second positive C plates 1140 and 1142 are compensated by the first and second positive A plates 1160 and 1162. As a result, the USH mode LCD device has an identical optic property at any viewing angle. Accordingly, the USH mode LCD device according to the eleventh embodiment of the present invention has advantages in a response speed, a contrast ratio and a viewing angle.

Figure 15:
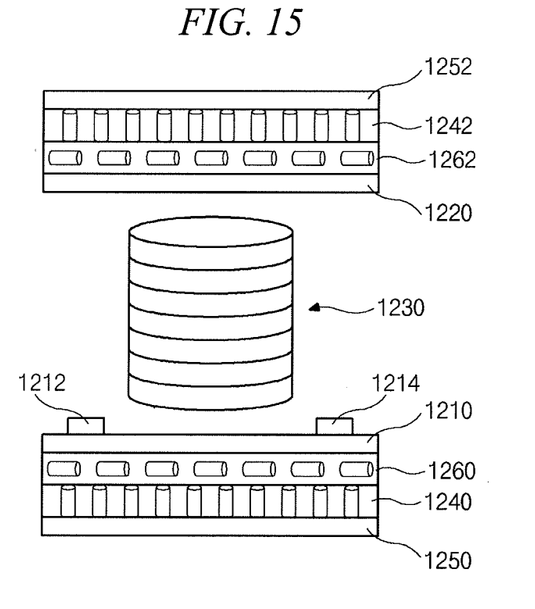
FIG. 15 is a view showing a uniform standing helix mode liquid crystal display device according to a twelfth embodiment of the present invention.

In FIG. 15, a USH mode LCD device according to a twelfth embodiment of the present invention includes first and second substrates 1210 and 1220 facing and spaced apart from each other, a liquid crystal layer 1130 between the first and second substrates 1210 and 1220, a first positive A plate 1260 on an outer surface of the first substrate 1210, a first positive C plate 1240 on the first positive A plate 1260, a first polarizing plate 1250 on the first positive C plate 1240, a second positive A plate 1262 on an outer surface of the second substrate 1220, a second positive C plate 1242 on the second positive A plate 1262 and a second polarizing plate 1252 on the second positive C plate 1242. A pixel electrode 1212 and a common electrode 1214 are formed on an inner surface of the first substrate 1210, and a horizontal electric field is generated between the pixel electrode 1212 and the common electrode 1214 when a voltage is applied.

The liquid crystal layer 1230 is driven by the horizontal electric field between the pixel electrode 1212 and the common electrode 1214. First and second polarization axes of the first and second polarizing plates 1250 and 1252 are perpendicular to each other. The liquid crystal layer 1230 includes chiral nematic liquid crystal molecules having a helical axis parallel to an optic axis (z direction) normal to the inner surface of the first substrate 1210. Accordingly, the chiral nematic liquid crystal molecules are driven by the horizontal electric field substantially perpendicular to the helical axis. In addition, the liquid crystal layer 1230 has refractive indices along x, y and z directions $n_x$, $n_y$ and $n_z$, where the z direction is defined as a direction parallel to the helical axis and the x and y directions are defined as two directions perpendicular to the z direction. The refractive indices along x and y directions of the liquid crystal layer 1230 are the same as each other, and the refractive index along z direction of the liquid crystal layer 1230 is smaller than the refractive indices along x and y directions of the liquid crystal layer 1230. ($n_z<n_x=n_y$) As a result, the liquid crystal layer 1230 functions as a negative C plate.

The first positive C plate 1240 is formed between the first substrate 1210 and the first polarizing plate 1250 and the second positive C plate 1242 is formed between the second substrate 1220 and the second polarizing plate 1252 to compensate the liquid crystal layer 1230 functioning as a negative C plate. Each of the first and second positive C plates 1240 and 1242 may include a plurality of molecules of a bar shape arranged vertically. However, each of the first and second positive C plates 1240 and 1242 does not have a perfect vertical arrangement of the plurality of molecules. As a result, each of the first and second positive C plates 1240 and 1242 having a slanting arrangement does not completely compensate the liquid crystal layer 1230. For example, although a light leakage at a side viewing angle is reduced, the USH mode LCD device may have a light leakage at a front viewing angle.

To solve the above problems, the first positive A plate 1260 is formed between the first substrate 1210 and the first positive C plate 1240 and the second positive A plate 1262 is formed between the second substrate 1220 and the second positive C plate 1242. Each of the first and second positive A plates 1260 and 1262 has refractive indices along x, y and z directions. The refractive indices along y and z directions of each of the first and second positive A plates 1260 and 1262 are the same as each other, and the refractive index along x direction of each of the first and second positive A plates 1260 and 1262 is greater than the refractive indices along y and z directions of each of the first and second positive A plates 1260 and 1262. ($n_x > n_y = n_z$) For example, each of the first and second positive A plates 1260 and 1262 may include a plurality of molecules of a bar shape arranged horizontally.

The limit at a side viewing angle is overcome by combination of the first and second positive C plates 1240 and 1242 and the liquid crystal layer 1230, and the first and second positive C plates 1240 and 1242 are compensated by the first and second positive A plates 1260 and 1262. As a result, the USH mode LCD device has an identical optic property at any viewing angle. Accordingly, the USH mode LCD device according to the twelfth embodiment of the present invention has advantages in a response speed, a contrast ratio and a viewing angle.

Consequently, in a uniform standing helix mode liquid crystal display device according to the present invention, a response speed, a viewing angle and a contrast ratio are improved due to at least one positive C plate. Specifically, a side viewing angle is compensated by at least one positive C plate, and the at least one positive C plate is compensated by at least one positive A plate.

It will be apparent to those skilled in the art that various modifications and variations can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A liquid crystal display device, comprising:
   first and second substrates facing and spaced apart from each other;
   a pixel electrode and a common electrode on an inner surface of the first substrate, the pixel electrode and the common electrode generating a horizontal electric field;
   a liquid crystal layer between the first and second substrates, wherein the liquid crystal layer includes a plurality of chiral nematic liquid crystal molecules having a helical axis parallel to a z direction normal to the first substrate and driven by the horizontal electric field, and wherein refractive indices of the liquid crystal layer along x and y directions ($n_x$, $n_y$) perpendicular to the z direction are the same as each other and a refractive index of the liquid crystal layer along the z direction ($n_z$) is smaller than the refractive indices of the liquid crystal layer along the x and y directions ($n_z < n_x = n_y$);
   first and second polarizing plates over outer surface of the first and second substrates, respectively; and
   at least one positive C plate over one of the outer surfaces of the first and second substrates, wherein refractive indices of the at least one positive C plate along the x and y directions ($n_x$, $n_y$) are the same as each other and a refractive index of the positive C plate along the z direction ($n_z$) is greater than the refractive indices of the positive C plate along the x and y directions ($n_z > n_x = n_y$).

2. The device according to claim 1, wherein the first and second polarizing plates have first and second polarization axes, respectively, perpendicular to each other.

3. The device according to claim 1, wherein the at least one positive C plate includes a positive C plate between the second substrate and the second polarizing plate.

4. The device according to claim 1, wherein the at least one positive C plate includes a positive C plate between the first substrate and the first polarizing plate.

5. The device according to claim 1, further comprising at least one positive A plate over one of the outer surfaces of the first and second substrates, wherein refractive indices of the at least one positive A plate along the y and z directions ($n_y$, $n_z$) are the same as each other and a refractive index of the positive A plate along the x direction ($n_x$) is greater than the refractive indices of the positive A plate along the y and z directions ($n_x > n_y = n_z$).

6. The device according to claim 5, wherein the at least one positive C plate includes a positive C plate between the second substrate and the second polarizing plate and the at least one positive A plate includes a positive A plate between the second substrate and the positive C plate.

7. The device according to claim 5, wherein the at least one positive C plate includes a positive C plate between the second substrate and the second polarizing plate and the at least one positive A plate includes a positive A plate between the positive C plate and the second polarizing plate.

8. The device according to claim 5, wherein the at least one positive C plate includes a positive C plate between the first substrate and the first polarizing plate and the at least one positive A plate includes a positive A plate between the first substrate and the positive C plate.

9. The device according to claim 5, wherein the at least one positive C plate includes a positive C plate between the first substrate and the first polarizing plate and the at least one positive A plate includes a positive A plate between the positive C plate and the first polarizing plate.

10. The device according to claim 5, wherein the at least one positive C plate includes a positive C plate between the second substrate and the second polarizing plate and the at least one positive A plate includes a positive A plate between the first substrate and the first polarizing plate.

11. The device according to claim 5, wherein the at least one positive C plate includes a positive C plate between the first substrate and the first polarizing plate and the at least one positive A plate includes a positive A plate between the second substrate and the second polarizing plate.

12. The device according to claim 1, wherein the at least one positive C plate includes a first positive C plate between the first substrate and the first polarizing plate and a second positive C plate between the second substrate and the second polarizing plate.

13. The device according to claim 12, further comprising a first positive A plate between the first positive C plate and the first polarizing plate and a second positive A plate between the second positive C plate and the second polarizing plate, wherein refractive indices of each of the first and second positive A plates along the y and z directions ($n_y$, $n_z$) are the same as each other and a refractive index of each of the first and second positive A plates along the x direction ($n_x$) is greater than the refractive indices of each of the first and second positive A plates along the y and z directions ($n_x > n_y = n_z$).

14. The device according to claim 12, further comprising a first positive A plate between the first substrate and the first positive C plate and a second positive A plate between the second substrate and the second positive C plate, wherein refractive indices of each of the first and second positive A plates along the y and z directions ($n_y$, $n_z$) are the same as each other and a refractive index of each of the first and second positive A plates along the x direction ($n_x$) is greater than the refractive indices of each of the first and second positive A plates along the y and z directions ($n_x > n_y = n_z$).

\* \* \* \* \*